US012596824B2

(12) United States Patent
Roth et al.

(10) Patent No.: US 12,596,824 B2
(45) Date of Patent: Apr. 7, 2026

(54) METHOD, DEVICE, AND NON-TRANSITORY COMPUTER READABLE MEDIUM FOR OBFUSCATING DATA

(71) Applicant: Charles Schwab & Co., Inc, San Francisco, CA (US)

(72) Inventors: Valerie Roth, San Francisco, CA (US); Brandon Lind, San Francisco, CA (US); Stephanie Lucas, San Francisco, CA (US); Maribel Mendoza, San Francisco, CA (US)

(73) Assignee: CHARLES SCHWAB & CO., INC., San Francisco, CA (US)

( * ) Notice: Subject to any disclaimer, the term of this patent is extended or adjusted under 35 U.S.C. 154(b) by 318 days.

(21) Appl. No.: 18/306,458

(22) Filed: Apr. 25, 2023

(65) Prior Publication Data

US 2024/0362350 A1    Oct. 31, 2024

(51) Int. Cl.
*G06F 21/62*        (2013.01)

(52) U.S. Cl.
CPC ............................... *G06F 21/6218* (2013.01)

(58) Field of Classification Search
CPC ............. H04L 63/0421; G06F 21/6209; G06F 21/6254
See application file for complete search history.

(56) References Cited

U.S. PATENT DOCUMENTS

| | | | |
|---|---|---|---|
| 11,232,231 B1* | 1/2022 | November | ............ H04L 9/3213 |
| 2018/0052904 A1* | 2/2018 | Fusco | ................. G06F 16/9535 |
| 2019/0354544 A1* | 11/2019 | Hertz | ..................... G06N 5/025 |
| 2020/0250139 A1* | 8/2020 | Muffat | .................. G06N 20/00 |
| 2020/0334416 A1* | 10/2020 | Vianu | ................. G06N 3/0442 |
| 2021/0256160 A1 | 8/2021 | Hachey | |
| 2022/0414257 A1* | 12/2022 | November | .......... G06F 16/9566 |

FOREIGN PATENT DOCUMENTS

WO        2021/178689 A1      9/2021

OTHER PUBLICATIONS

International Search Report and Written Opinion issued May 10, 2024 in International Application No. PCT/US2024/018848.
International Preliminary Report on Patentability issued Oct. 16, 2025 for International Application No. PCT/US2024/018848.

* cited by examiner

*Primary Examiner* — Phy Anh T Vu
(74) *Attorney, Agent, or Firm* — Harness, Dickey & Pierce, P.L.C.

(57)        ABSTRACT

A device, method, and non-transitory computer readable medium for obfuscating text data by selectively masking incoming tokens within the text data based on allowed tokens within an allow list, and storing a result thereof within a memory.

26 Claims, 6 Drawing Sheets

Figure 6:
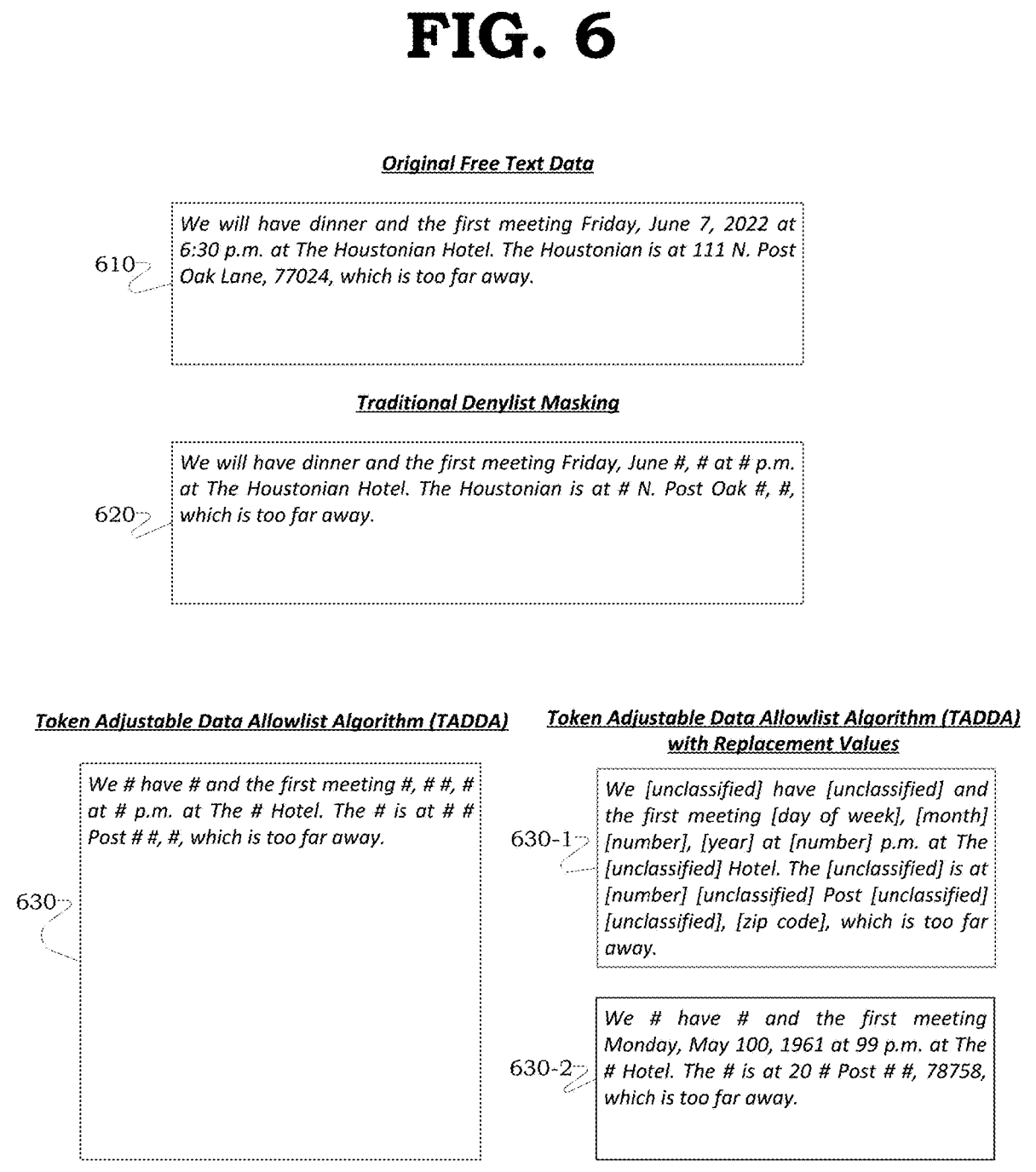

*Original Free Text Data*

610

> We will have dinner and the first meeting Friday, June 7, 2022 at 6:30 p.m. at The Houstonian Hotel. The Houstonian is at 111 N. Post Oak Lane, 77024, which is too far away.

*Traditional Denylist Masking*

620

> We will have dinner and the first meeting Friday, June #, # at # p.m. at The Houstonian Hotel. The Houstonian is at # N. Post Oak #, #, which is too far away.

*Token Adjustable Data Allowlist Algorithm (TADDA)*

630

> We # have # and the first meeting #, # #, # at # p.m. at The # Hotel. The # is at # # Post # #, #, which is too far away.

*Token Adjustable Data Allowlist Algorithm (TADDA) with Replacement Values*

630-1

> We [unclassified] have [unclassified] and the first meeting [day of week], [month] [number], [year] at [number] p.m. at The [unclassified] Hotel. The [unclassified] is at [number] [unclassified] Post [unclassified] [unclassified], [zip code], which is too far away.

630-2

> We # have # and the first meeting Monday, May 100, 1961 at 99 p.m. at The # Hotel. The # is at 20 # Post # #, 78758, which is too far away.

METHOD, DEVICE, AND NON-TRANSITORY COMPUTER READABLE MEDIUM FOR OBFUSCATING DATA

BACKGROUND

Field

Various example embodiments relate to methods, devices and/or non-transitory computer readable media for obfuscating data. For example, at least some example embodiments relate to methods, devices and/or non-transitory computer readable media for obfuscating text data by tokenizing words in a data source and comparing the tokenized words to a list of allowed words.

Description of the Related Art

The statements in this section merely provide background information related to example embodiments and may not constitute prior art.

Free text data may be compiled in a string format, where the input may be unrestricted and/or unpredictable and, therefore, has the potential to be embedded with various types of sensitive data elements. Examples include call transcripts where a client may have provided sensitive information such as a social security number to establish their identity, chat logs of a conversation with a client where clients may have provided personal account details within the context of asking for help, or search strings where a client may themselves have entered sensitive data directly into a search dialog.

Personnel tasked with managing this sensitive free text data are frequently asked to provide access to this data to downstream partners both within their organizations and outside of their organization for reporting, analysis, and other purposes.

Conventional data obfuscating techniques may rely on scrubbing sensitive data using deny list techniques, which may only remove obvious identifiers that match preset patterns present within a predetermined deny list. As such, the resulting data may contain data that is either identifiable and/or at risk of being re-identifiable. Therefore, sensitive data that does not match the preset patterns may be retained and copied over to a sharable environment. Further, the definition of what data is considered "sensitive" may evolve over time and, moreover, a client may input sensitive data in an unexpected format that may not be picked up by such conventional data obfuscating techniques.

As such, with conventional data obfuscating techniques, client's sensitive information may be exposed to unnecessary risks and the personnel tasked with managing the sensitive data may not be able to confidently confirm whether the data protection standards of their organization are being satisfied.

Accordingly, an approach is desired that adheres to an organization's data protection standards, while allowing access to information that facilitates business operations and insights needed to serve clients and make informed business decisions.

SUMMARY

Some example embodiments are directed to a device configured to obfuscate text data.

In some example embodiments, the device includes a memory configured to store computer readable instructions;

and processing circuitry configured to execute the computer readable instructions to cause the device to selectively mask incoming tokens within the text data based on allowed tokens within an allow list, and store a result thereof within the memory.

In some example embodiments, the device is further configured to create the allow list.

In some example embodiments, the device is further configured to standardize the allowed tokens within the allow list.

In some example embodiments, the device is configured to selectively mask elements by standardizing the incoming tokens within the text data based on a standardization employed within the allow list.

In some example embodiments, the device is configured to selectively mask the incoming tokens by mapping the incoming tokens within the text data to a standardized version thereof.

In some example embodiments, the device is configured to selectively mask the incoming tokens by evaluating whether the standardized version of the incoming tokens corresponds to one of the allowed tokens within the allow list.

In some example embodiments, in response to the device determining that the standardized version of the incoming tokens corresponds to one of the allowed tokens, the device is configured to append the standardized version of the incoming tokens to a string, and add a delineator to the string thereafter.

In some example embodiments, in response to the device determining that the standardized version of the incoming tokens does not correspond to any of the allowed tokens, the device is configured to append a mask to a string in place of the standardized version of the incoming token, and add a delineator to the string thereafter.

In some example embodiments, the device is configured to add the string to a corpus of masked data elements, in response to reaching an end of the text data.

In some example embodiments, the device is configured to determine a coverage of the corpus of masked data elements based on a ratio of the corpus that contains unmasked tokens.

In some example embodiments, the device is configured to release the corpus of masked data elements downstream, in response to the coverage satisfying a coverage threshold.

In some example embodiments, the memory is configured to store a plurality of replacement patterns each corresponding to a category of regularly occurring denied tokens, and wherein, in response to the device determining that the standardized version of the incoming tokens does not correspond to any of the allowed tokens, the device is configured to, determine whether the plurality of replacement patterns includes a corresponding replacement pattern that corresponds to the standardized version of the incoming token, and append the corresponding replacement pattern to a string in place of the standardized version of the incoming token and add a delineator to the string thereafter, in response to determining that the plurality of replacement patterns includes the corresponding replacement pattern.

In some example embodiments, the device is configured to, add the string to a corpus of masked data elements, in response to reaching an end of the text data, and release the corpus of masked data elements to a downstream environment along with a replacement values map, if the device determines that the downstream environment meets set security requirements, the replacement values map containing information that allows the downstream environment to replace the corresponding replacement pattern with data that provides an indication of the category of regularly occurring denied tokens that is associated with the standardized version of the incoming token.

In some example embodiments, the device is configured to select the allow list from among a library of allow lists or utilize an allow list that has been custom-made for the text data.

Some example embodiments are directed to a method of obfuscating text data.

In some example embodiments, the method includes selectively masking incoming tokens within the text data based on allowed tokens within an allow list; and storing a result of masking within a memory.

In some example embodiments, the method further includes creating the allow list.

In some example embodiments, the method further includes standardizing the allowed tokens within the allow list.

In some example embodiments, the selectively masking includes standardizing the incoming tokens within the text data based on a standardization employed within the allow list.

In some example embodiments, the selectively masking includes mapping the incoming tokens within the text data to a standardized version thereof.

In some example embodiments, the selectively masking includes evaluating whether the standardized version of the incoming tokens corresponds to one of the allowed tokens within the allow list.

In some example embodiments, the selectively masking includes appending the standardized version of the incoming tokens to a string and adding a delineator to the string thereafter, in response to determining that the standardized version of the incoming tokens corresponds to one of the allowed tokens.

In some example embodiments, the selectively masking includes appending a mask to a string in place of the standardized version of the incoming tokens and adding a delineator to the string thereafter, in response to determining that the standardized version of the incoming tokens does not corresponds to any of the allowed tokens.

In some example embodiments, the method further includes adding the string to a corpus of masked data elements, in response to reaching an end of the text data.

In some example embodiments, the method further includes determining a coverage of the corpus of masked data elements based on a ratio of the corpus that contains unmasked tokens.

In some example embodiments, the method further includes releasing the corpus of masked data elements downstream, in response to the coverage satisfying a coverage threshold.

In some example embodiments, the memory is configured to store a plurality of replacement patterns each corresponding to a category of regularly occurring denied tokens. In response to determining that the standardized version of the incoming tokens does not correspond to any of the allowed tokens, the method further includes determining whether the plurality of replacement patterns includes a corresponding replacement pattern that corresponds to the standardized version of the incoming token; and appending the corresponding replacement pattern to a string in place of the standardized version of the incoming token and add a delineator to the string thereafter, in response to determining that the plurality of replacement patterns includes the corresponding replacement pattern.

In some example embodiments, the method further includes adding the string to a corpus of masked data elements, in response to reaching an end of the text data, and releasing the corpus of masked data elements to a downstream environment along with a replacement values map, if the downstream environment meets set security requirements, the replacement values map containing information that allows the downstream environment to replace the corresponding replacement pattern with data that provides an indication of the category of regularly occurring denied tokens that is associated with the standardized version of the incoming token.

Some example embodiments are directed to a non-transitory computer readable medium storing computer readable instructions that, when executed by processing circuitry of a device, configures the device to perform a method of obfuscating text data.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The accompanying drawings, which are incorporated in and constitute a part of the specification, illustrate one or more example embodiments and, together with the description, explain these example embodiments. In the drawings:

FIG. 6 illustrates examples of obfuscated data according to example embodiments.

DETAILED DESCRIPTION

Figure 1:
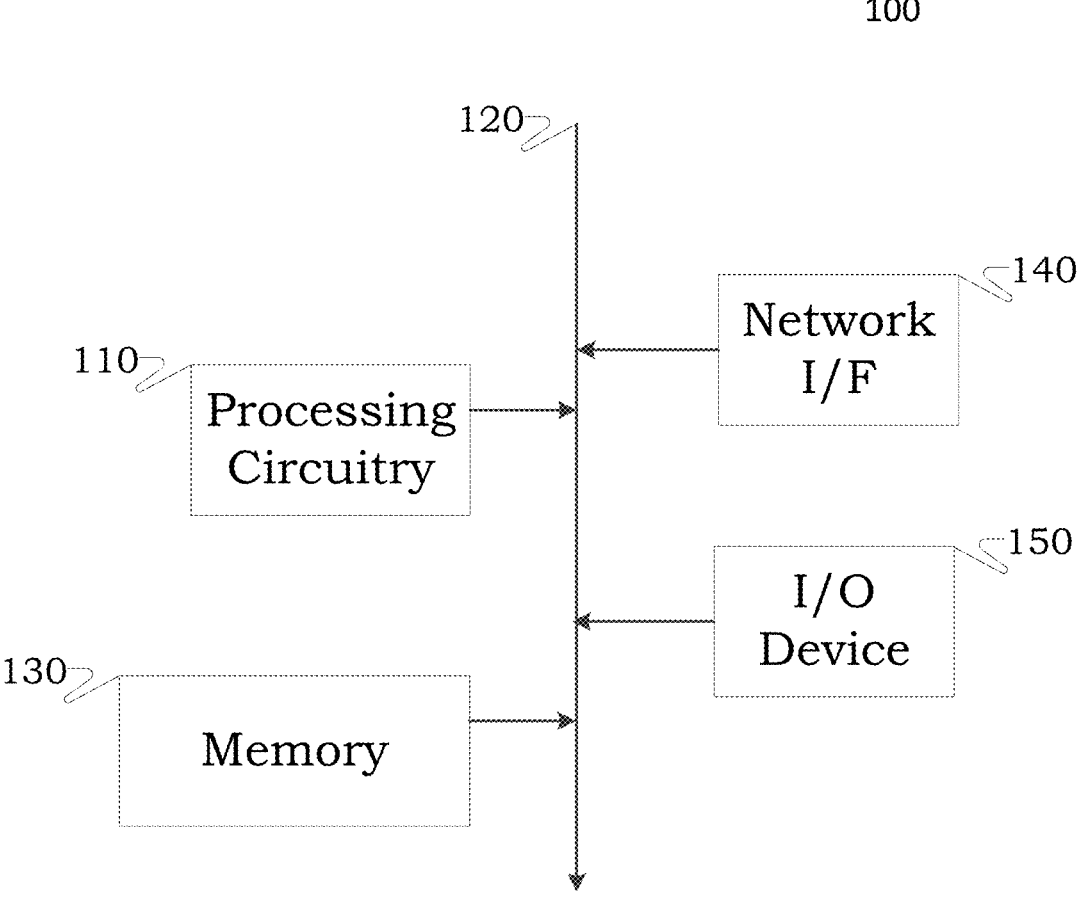
FIG. 1 illustrates a device configured to obfuscate text data according to example embodiments.

Various example embodiments will now be described more fully with reference to the accompanying drawings in which some example embodiments are shown.

Detailed example embodiments are disclosed herein. However, specific structural and functional details disclosed herein are merely representative for purposes of describing the example embodiments. The example embodiments may, however, may be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the example embodiments. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting of the example embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of the example embodiments. However, it will be understood by one of ordinary skill in the art that example embodiments may be practiced without these specific details. For example, systems may be shown in block diagrams in order not to obscure the example embodiments in unnecessary detail. In other instances, well-known processes, structures and techniques may be shown without unnecessary detail in order to avoid obscuring example embodiments.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term "memory" may represent one or more devices for storing data, including random access memory (RAM), magnetic RAM, core memory, and/or other machine readable mediums for storing information. The term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" may include, but is not limited to, portable or fixed storage devices, optical storage devices, wireless channels, and various other mediums capable of storing, containing or carrying instruction(s) and/or data.

Furthermore, example embodiments may be implemented by hardware circuitry and/or software, firmware, middleware, microcode, hardware description languages, etc., in combination with hardware (e.g., software executed by hardware, etc.). When implemented in software, firmware, middleware or microcode, the program code or code segments to perform the desired tasks may be stored in a machine or computer readable medium such as a non-transitory computer storage medium, and loaded onto one or more processors to perform the desired tasks.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used in this application, the term "circuitry" and/or "hardware circuitry" may refer to one or more or all of the following: (a) hardware-only circuit implementation (such as implementations in only analog and/or digital circuitry); (b) combinations of hardware circuits and software, such as (as applicable): (i) a combination of analog and/or digital hardware circuit(s) with software/firmware, and (ii) any portions of hardware processor(s) with software (including digital signal processor(s)), software, and memory(ies) that work together to cause an apparatus, such as a mobile phone, a smart device, and/or server, etc., to perform various functions); and (c) hardware circuit(s) and/or processor(s), such as microprocessor(s) or a portion of a microprocessor(s), that requires software (e.g., firmware) for operation, but the software may not be present when it is not needed for operation. For example, the circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

FIG. 1 illustrates a device configured to obfuscate text data according to example embodiments.

Referring to FIG. 1, a device 100 configured to obfuscate text data may include processing circuitry 110 such as at least one processor, at least one communication bus 120, a memory 130, at least one network interface (I/F) 140, and/or at least one input/output (I/O) device 150 (e.g., a keyboard, a monitor, a touchscreen, a mouse, a microphone, a camera, a speaker, etc.), etc., but the example embodiments are not limited thereto.

The memory 130 may include various special purpose program code including computer executable instructions which may cause the device 100 to perform one or more of the methods of the example embodiments, including but not limited to obfuscating text data by tokenizing words in a data source and comparing the tokenized words to a list of allowed words.

In at least one example embodiment, the processing circuitry 110 may include processor cores, distributed processors, or networked processors. The processing circuitry 110 may be configured to control one or more elements of the device 100, and thereby cause the device 100 to perform various operations. The processing circuitry 110 is configured to execute processes by retrieving program code (e.g., computer readable instructions) and data from the memory 130 to process them, thereby executing special purpose control and functions of the entire device 100. Once the special purpose program instructions are loaded into, (e.g., the at least one processor), the processing circuitry 110 executes the special purpose program instructions, thereby transforming the processing circuitry 110 into a special purpose processor.

In at least one example embodiment, the memory 130 may be a non-transitory computer-readable storage medium and may include a random access memory (RAM), a read only memory (ROM), and/or a permanent mass storage device such as a disk drive, or a solid-state drive. Stored in the memory 130 is program code (i.e., computer readable instructions) related to obfuscating text data such as the methods discussed in connection with FIGS. 2 and 3, and controlling the at least one network interface 140, and/or at least one I/O device 150, etc.

Such software elements may be loaded from a non-transitory computer-readable storage medium independent of the memory 130, using a drive mechanism (not shown) connected to the device 100, or via the at least one network interface 140, and/or at least one I/O device 150, etc.

In at least one example embodiment, the at least one communication bus 120 may enable communication and/or data transmission to be performed between elements of the device 100. The communication bus 120 may be implemented using a high-speed serial bus, a parallel bus, and/or any other appropriate communication technology. According to some example embodiments, the device 100 may include a plurality of communication buses (not shown).

While FIG. 1 depicts an example embodiment of the device 100, the device 100 is not limited thereto, and may include additional and/or alternative architectures that may be suitable for the purposes demonstrated. For example, the functionality of the device 100 may be divided among a plurality of physical, logical, and/or virtual server and/or computing devices, network elements, etc.

Figure 2:
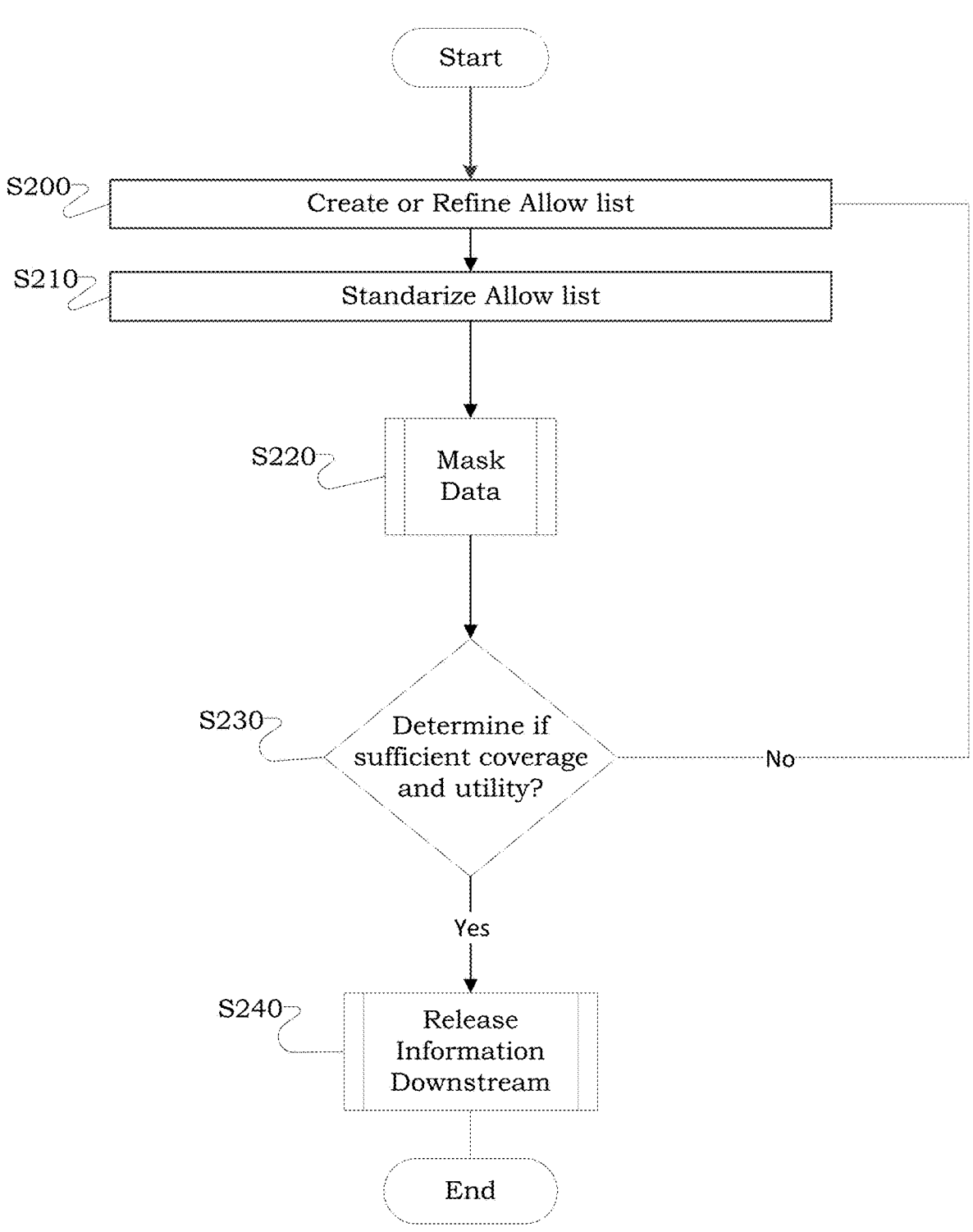
FIG. 2 illustrates a method of obfuscating text data and providing obfuscated text data for downstream use according to example embodiments.

FIG. 2 illustrates a method of obfuscating text data and providing obfuscated text data for downstream use according to example embodiments.

Referring to FIG. 2, in operation S200, the device 100 may create or refine an allow list. The allowlist may be a .txt file, a .csv file, or a file of another format.

For example, the device 100 may generate or refine a previously generated text file as the allow list. The text file may include a list of tokens delineated by one or more characters, such as a slash, dash, or pound sign, or a string of characters that separate the individual tokens within the text file. Many of the elements on the allow list may represent words or other elements that are deemed to be safe to share in their unmasked form.

The device 100 may store the allow list in a location such that both the allow list and the original free text data to be transformed are accessible within the same processing platform. For example, the text file may be stored in a database in the memory 130. The database may be configured to allow for querying (ability to reference, manipulate and extract) data. Alternatively, the allow list may be stored on a server or collection of servers with data processing software installed (such as the Python programming language, SQL programming language, or a combination of both programming languages).

The allow list may be generated based on input from, for example, a user with subject matter expertise about a given dataset. In some example embodiments, the device 100 may inspect frequencies of phrases in the free text corpus and give the most frequently used phrases special consideration for inclusion within the allow list given the high coverage provided by such phrases.

Alternatively, the device 100 may utilize various topic modeling techniques within the natural language processing domain such as Latent Dirichlet Allocation (which can observe co-occurrences of tokens within a corpus of free text data elements to infer topics) to aid in allow list token selection. The goal of such processes is to procure a list of words that may be top contenders for the allow list. In Latent Dirichlet allocation, each record in a database, or file in a corpus of files, or chapter in a book can be grouped together with other records, files, or chapters having statistically-determined associations (i.e., belonging to the same "topic"). Since these associations are determined by the relationships of individual tokens within each record, file, or chapter, the top tokens associated with each derived topic can also be statistically determined. The top tokens from a set number of identified topics may be retained and added to the allow list.

In some example embodiments, the device 100 may be configured to build the allow list based upon classifications made by a machine learning model or combination of models such as logistic regression. Such a model may estimate the probability of a given token within a body of text being sensitive or not.

The device 100 may be configured to add tokens within the body of text to the allow list that meet an initial certainty threshold for being non-sensitive. For example, the initial certainty threshold may be set at 95%, such that if the model outputs a 95% or greater certainty that a given token is non-sensitive, the device 100 may add that token to the allow list for unmasking downstream. In contrast, the device 100 may reject tokens that do not meet this certainty threshold from being added to the allow list, and thus free text that matches such tokens will not remain unmasked downstream. The benefit of starting with a high certainty threshold is that by default, little or no more data than is needed will be unmasked for a particular use case. This promotes a high level of data security in balance with operational needs.

In some example embodiments, the device 100 may also build a library of allow lists based on specific downstream use cases. For example, some downstream partners may wish to evaluate call transcripts for a navigation need such that a particular allow list that contains tokens that would be helpful in such an evaluation is selected, and some downstream partners may wish to perform education evaluation such that a different allow list associated with this use case is selected.

In some example embodiments, the device 100 may create libraries of specialized allow lists for different types of free text. For example, different information or communication styles may be present in an online chat, a call transcript, a search, and a survey response. As an example, abbreviations could be more common in an online chat as compared to a call transcript. Further, the chances of typos/ variations may be higher with manually entered search terms than other methods. The device 100 may select one of these specialized allow lists within a library as needed depending on the type of free text to be obfuscated.

In operation S210, the device 100 may standardize the tokens within the allow list.

For example, the device 100 may screen each value stored in the allow list to check whether the respective value's format, such as capitalization and punctuation, is standardized.

The device 100 may standardize the capitalization of tokens within the allow list by, for example, making:

All characters uppercase;

All characters lowercase;

All tokens start with an uppercase character, followed by lowercase characters;

All characters in a token must be lowercase except the last character in a token, which must be uppercase; and/or Any complex capitalization logic, such as logic designed to follow common conventions within a given language.

Further, in addition to capitalization standardization, the device 100 may review the tokens to ensure other standardization amongst the tokens. For example, the device 100 may standardize punctuation within the allow list. The device may standardize the punctuation of the tokens with the allow list by, for example, making:

Removing all punctuation within the tokens;

Only specific punctuation (such as the "@" sign only) within the tokens; and/or

Ensuring each token ends with a given punctuation element, which is added to the end of each token if it is not already present.

The above examples are merely examples of standardization and are not considered to be exhaustive.

The device 100 may standardize the tokens by either revising the tokens in the original allow list that do not comply with a selected standardization such that the revised token satisfies one or more of the aforementioned standardizations or copying the revised tokens to an entirely new clean allow list in which the tokens are revised to satisfy one or more of the aforementioned standardizations.

In some example embodiments, operation S210 may be omitted. For example, in some example embodiments, the device 100 or another system may only allow tokens to be entered into the allow list that meet a set criteria such that further standardization by the device 100 is not required.

In operation S220, the device 100 may mask the data by applying a Token Adjustable Data Allowlisting Algorithm (TADAA) to the data based on the allow list. The masking of the data using the TADAA based on the allow list will be discussed in more detail below with reference to FIG. 3.

In operation S230, the device 100 may evaluate the masked data to, for example, determine whether the coverage and utility provided is sufficient to allow the data to be available for downstream consumption. Coverage in this context may refer to the percentage of words that remain unmasked after the performance of the Token Adjustable Data Allowlisting Algorithm (TADAA). Further, utility may mean the level of information within the masked data that is available to downstream partners to meet their needs. It may also refer to a combination of these two considerations.

For example, after the corpus of masked data elements is created, the device 100 or, alternatively a separate external device, may evaluate the effectiveness of the masked data elements for both its coverage and utility to business needs.

In one embodiment, the device 100 may read through sample values within the corpus of masked data elements and determine whether an adequate amount of contextual information is available to meet the demands of downstream partners.

In another embodiment, the device 100 may calculate the coverage, which indicates the percentage of total tokens that remain unmasked, based on Equation 1:

$$\text{Coverage} = \text{\# of unmasked tokens/total \# of tokens} \qquad \text{(Equation 1)}$$

The device 100 may determine that the coverage is sufficient if the coverage is greater than a coverage threshold.

The device 100 may adjust the coverage threshold based on, for example:

The level of unmasked information required based on the use case:—For example, the device 100 may increase the coverage threshold in a use case where call transcripts must be read to ensure adherence to compliance requirements, and reduce the coverage threshold in a use case where only general sentiment is necessary (for example, to evaluate general customer satisfaction);

Data volume: The device 100 may adjust the coverage threshold based on the size of the data set. For example, the device 100 may reduce the threshold as the size of the data set increases since, as the number of unique tokens in need of evaluation increases, it may be difficult to obtain a large coverage fraction.

Data content: The device 100 may adjust the coverage threshold based on the content of the data set. For example, if the data is classified as being a type of data that is sensitive in nature, the device 100 may reduce the coverage threshold since it is expected that an increased number of tokens would be masked within a sensitive data set.

To determine the coverage threshold, the device 100 may rely on a questionnaire where elements such as the requirements of the use case, data volume and/or data content are measured. The device 100 may weigh each element's importance. For example, a weighted "expected coverage" score could be computed as follows:

20% (importance of level of info downstream data users need to glean from the data)×45% (measurement of level of info downstream data users need to glean from the data)×(40% (importance of data volume)×33% (measurement of data volume ))×(40% (importance of data contents)×92% (measurement of data contents))= 9%+13.2%+36.8%=59% (coverage expected)

Further, the device 100 may generate a list indicating a count of how many times each unique currently masked token appears within the corpus of masked data elements. A user may review high frequency masked tokens to determine whether it is desirable to add any of these elements to the allow list.

In another embodiment, the device 100 may calculate the coverage utilizing supervised machine learning in conjunction with labeled target data. For example, the device 100 may use automated machine learning to train and select one or more natural language processing (NLP) models using feature variables generated based on the masked data as predictors. If the generated NLP models meet certain success criteria such as accuracy, precision, recall, true positive rate, true negative rate, etc., the device 100 may determine that the coverage and utility of the masked data is sufficient.

In another embodiment, the device 100 may calculate the coverage using unsupervised machine learning without utilizing labeled target data since unsupervised models do not require labeled target data, but instead result in cluster assignments that link related data samples together. For example, the device 100 may utilize feature variables generated based on the masked data to train an unsupervised NLP model using automated machine learning to train and select models such as a K-means clustering model. If the generated unsupervised model that has an adequate silhouette score (which measures how similar data samples within the same cluster are to each other, yet different from data samples in other clusters) or other clustering evaluation metric score, the device 100 may determine that the coverage and utility of the masked data is sufficient.

If the device 100 determines, using any of the aforementioned methods, that the masked data does not provide sufficient coverage and utility, the device 100 may refine the allow list by proceeding back to step S200.

In some example embodiments, the device 100 may lower the certainty threshold for adding sensitive data to the allow list. For example, if the initial certainty threshold was set at 95%, in the next iteration of allow list creation, a certainty threshold of 90% could then be established. If this still is unable to produce sufficient coverage and utility in the masked data, the threshold could be adjusted downwards further, until a minimum probability (perhaps 75%) is reached. If this minimum coverage amount is still unable to produce sufficient coverage and utility, TADAA would then deny the release of data, concluding that it could not be done while maintaining adequate data security standards.

In operation S240, if the masked data is determined to provide sufficient coverage and utility, the device 100 may allow the information to be available for downstream consumption. Details on releasing the information downstream will be discussed below with reference to FIG. 5.

Figure 3:
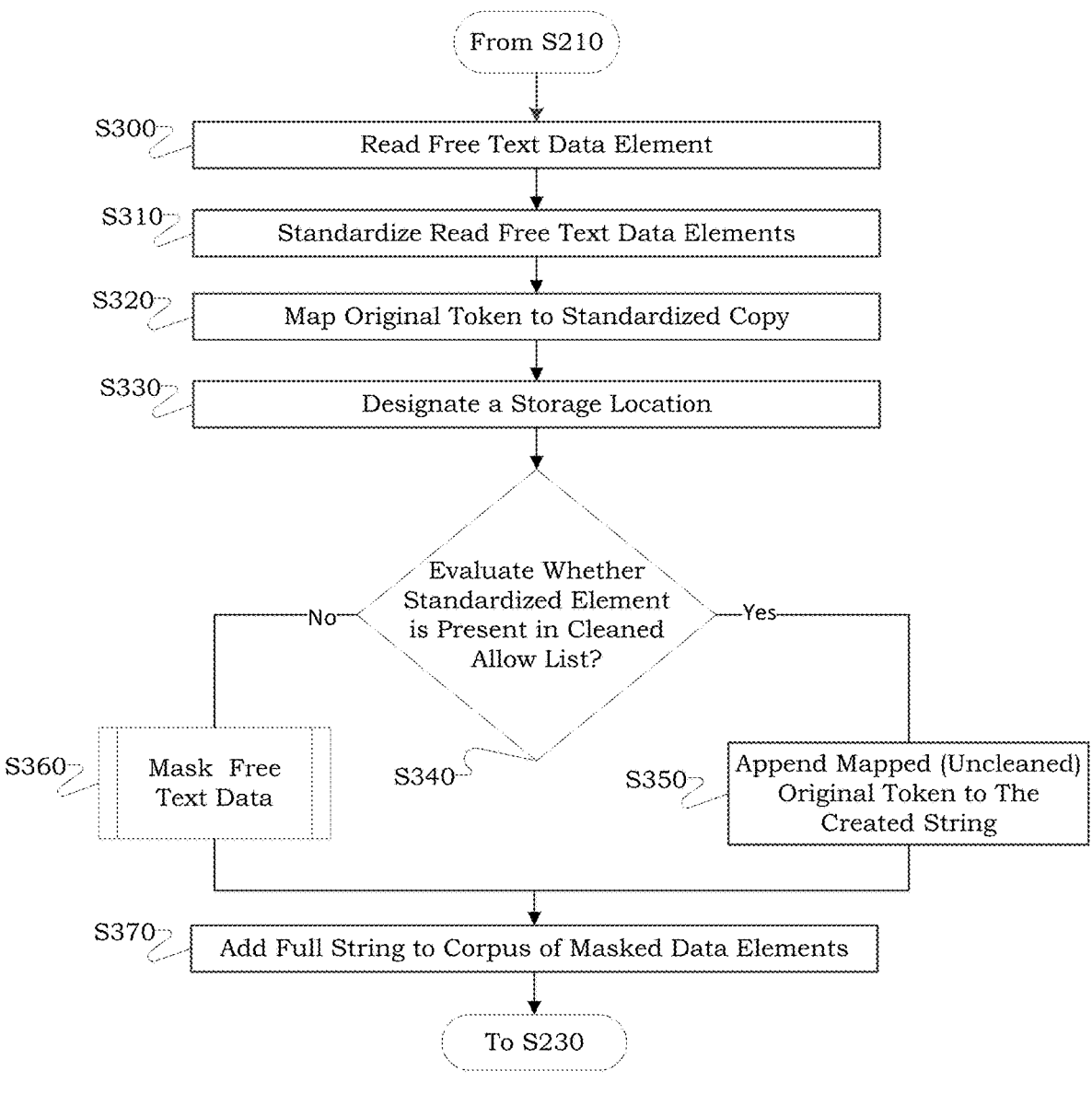
FIG. 3 illustrates a method of masking data using an allow list according to example embodiments.

FIG. 3 illustrates a method of masking data using an allow list according to example embodiments.

Referring to FIGS. 2 and 3, an example of a method of masking data in operation S220 of FIG. 2 by applying a Token Adjustable Data Allow listing Algorithm (TADAA) to the data is described in detail with reference to FIG. 3.

In operation S300, the device 100 may read a free text data element.

The device 100 may sequentially read a single free text data element at a time or may read a plurality of free text data elements in parallel depending on processing capabilities of the device 100.

For example, if data volumes are exceedingly high relative to processing capability, it may be desirable to process the elements in parallel so that they can be made available for downstream use within a reasonable amount of time. The device 100 may utilize, for example, Apache Spark, to parallel process a string containing a plurality of free text data elements.

The device 100 may delineate between the end of one token within a free text data element and the beginning of the next token based on for example, the presence of spaces, newlines, tabs, punctuation, or other delimiters, when scanning through each character in a string.

In operation S310, the device 100 may standardize the one or more read free text data elements. For example, the device 100 may utilize the same logic used to standardize the tokens in the allow list in operation S210 to standardize the tokens within the read free text data elements in operation S310.

Both the cleaned copy and the original data element may be retained along with the information that they are linked together. For example, the device 100 may store the cleaned copy of the read free text data elements and the standardized copy in two related variables such as a Python dictionary with the key being the original data and the value being the cleaned data.

The delimiter used to split the free text data elements should not be retained as part of the token list. Instead, what that character was, where it was found, and whether it can be added back is determined and done in later steps.

In operation S320, the device 100 may map each original token to a standardized copy.

For example, the device 100 may process the uncleaned data element character-by-character. Whenever a delimiter calling for tokenization (according to, for example, the rules described above) is encountered, the device 100 may identify the characters preceding it up until the last delimiter character encountered (or in the case that this is the first delimiter character, until the string began), as an "unclean token." Because these unclean tokens will be discovered in the same order as the tokens in the list described in the section above, these unclean tokens are naturally "mapped" by this positioning.

In operation S330, the device 100 may designate a storage location for the processed data. For example, the device 100 may create an empty string within, for example, Python.

The created string may be used subsequently to append thereto a combination of a masked allowed token (where token is not on the allow list) and an original allowed token (where token is on the allow list) allowed tokens as the device 100 performs the evaluation according to the Token Adjustable Data Allowlisting Algorithm (TADAA).

In operation S340, for each cleaned token copy, the device 100 may evaluate whether the cleaned token copy is present among the cleaned allow list tokens.

For example, the device 100 may iterate through every token in the allow list and determine whether the cleaned token originating from the free text data element is an exact match of the allow list element being considered.

The device 100 may stop evaluating the cleaned allow list tokens once a hit is found since it is unnecessary to continue to scan the rest of the list.

To increase the efficiency of the scan, the tokens in the allow list may be broken down into a dictionary/set type of data structure keyed by their first character. The device 100 may compare the free text data element by comparing the free text data element to only the allow list entries having the same first character as the free text data element.

In operation S350, if the device 100 determines that the cleaned token copy is present among the cleaned allow list tokens, and, thus, does not need to be masked, the device 100 may append its mapped unclean (original) token to the end of the string, and append a delimiter that followed the token under consideration after the mapped unclean token.

In operation S360, if the end of the allow list is reached without any matches identified, the device 100 may determine that the cleaned token copy is not present among the cleaned allow list tokens, and, thus, should be masked.

The masking will be discussed in more detail below with reference to FIG. 4. In operation S370, the device 100 may add the full string generated after all tokens associated with the free text data elements have been evaluated to the corpus of masked data elements.

The corpus may be a text file, a column value in a database, or another format in which data can be stored according to business needs for downstream use. The format of the corpus of masked data may be the same or different from the format of the corpus of original free text data. For example, the original free text data may be stored in a database column, and the generated corpus of masked data may be stored in individual text files.

Figure 4:
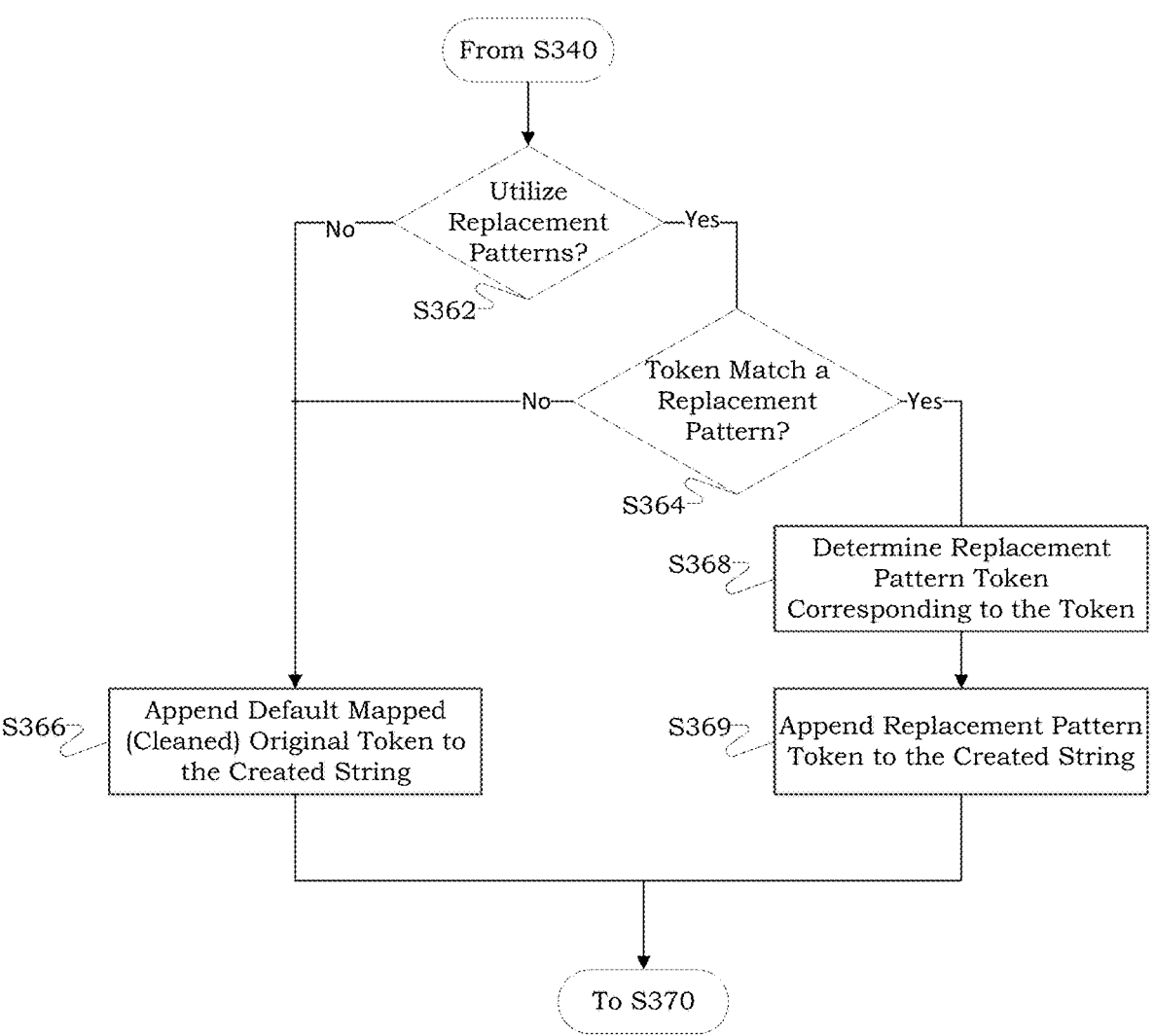
FIG. 4 illustrates a method of performing a masking operation according to example embodiments.

FIG. 4 illustrates a method of performing a masking operation according to example embodiments.

Referring to FIGS. 3 and 4, as discussed above, the device 100 may mask the free text data when the device 100 determines the cleaned token copy is not present in among the cleaned allow list tokens.

In some example embodiments, in operation S362, the device 100 may analyze whether the masking is set to be performed in view of replacement patterns or based only on a default masking character. For example, the device 100 may analyze whether a replacement pattern flag stored in the memory 130 is set, and may determine that the masking should be performed in view of the replacement patterns when the replacement pattern flag is set.

In operation S364, if the device 100 determines to utilize the replacement patterns, the device 100 may determine whether the cleaned token copy corresponds to an entry within a list of well-known denied tokens each having a corresponding replacement pattern.

In operation S366, if the device 100 determines not to utilize replacement patterns or the cleaned token copy does not correspond to an entry within the list of well-known denied tokens, the device 100 may append a character, such as "#," which is also a token, to the end of the created string. The device 100 may append the delineator after the character to mark the end of the masked token. However, example embodiments are not limited thereto and in some instances the device 100 may not append the delineator after the character. For example, in some example embodiments, the device 100 may not append the delineator after the character when the character is the last data element.

In contrast, in operation S368, if the device 100 determines that the cleaned token copy corresponds to an entry within the list of well-known denied tokens, the device 100 may determine the replacement pattern token that corresponds to the cleaned token copy using a mapping relationship between the list of well-known denied tokens and the corresponding replacement patterns.

In operation S369, the device 100 may mask the cleaned token copy using the determined replacement pattern that provides, for example, insight into the type of masked token.

For example, the list of well-known denied tokens may include a list of well-known first names, well-known last names, strings that are likely to correspond to account numbers or addresses, for example. The device 100 may store a mapping relationship between each of these well-known types of denied tokens and a corresponding replacement value. For example, rather than the default masking character, such as "#," the mapping relationship may indicate that each of the well-known first names corresponds to the replacement pattern "A1," each of the well-known last names corresponds to a replacement pattern "A2," etc. By utilizing a nondescript phrase as a replacement pattern such as "A1" rather than, for example, the phrase "first name", the replacement pattern itself may not provide an individual outside of the organization with any information to glean that "A1" corresponds to a first name, let alone the actual first name within the free text data.

As discussed above with reference to FIGS. 2 and 3, after adding the full string representing to a corpus of files to be shared downstream in operation S370 and determining that the coverage and utility of the full string is sufficient in operation S230, the device 100 may selectively release information for downstream consumption in operation S240.

Figure 5:
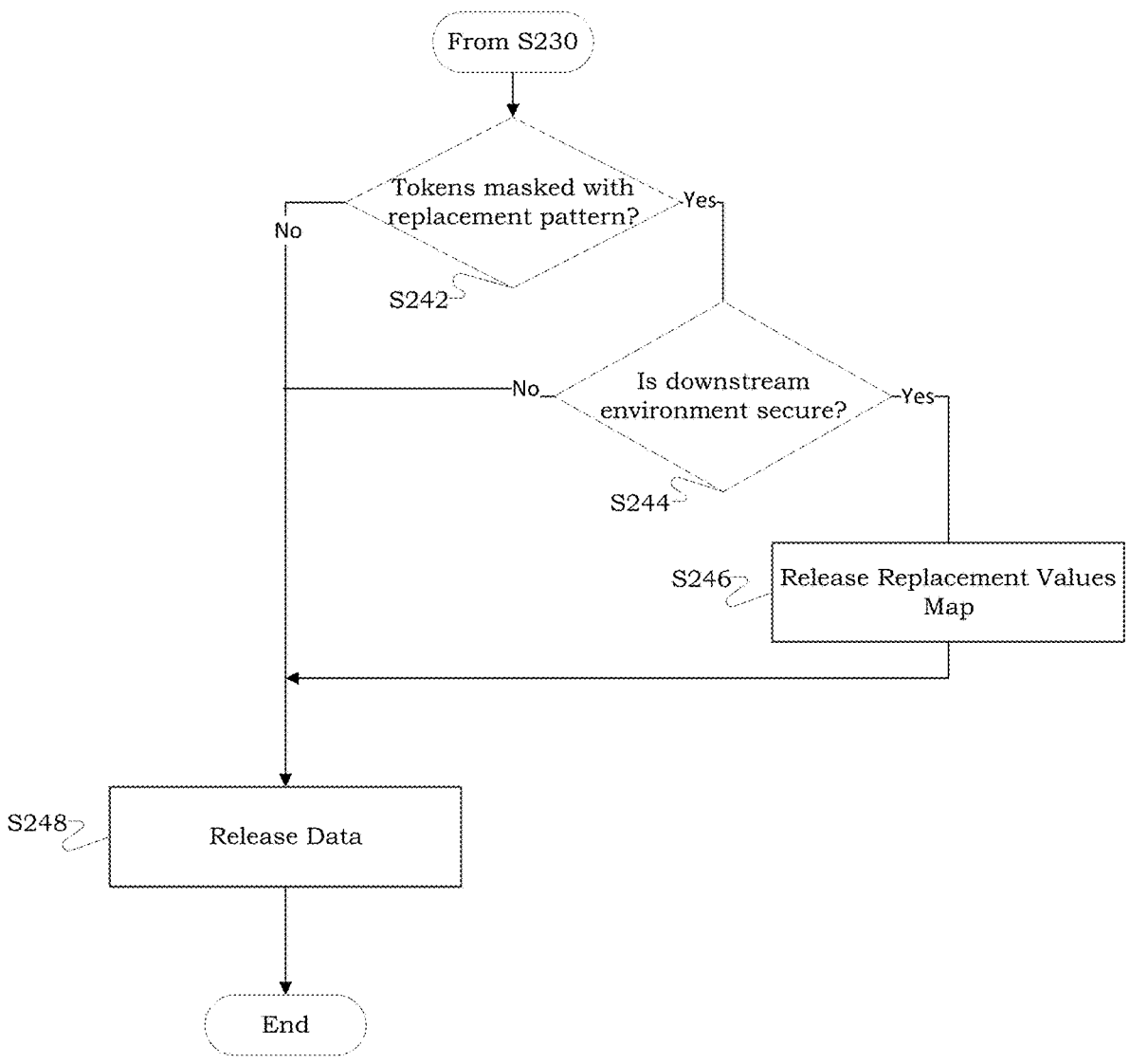
FIG. 5 illustrates a method of releasing data according to example embodiments.

FIG. 5 illustrates a method of releasing data according to example embodiments.

Referring to FIGS. 2 and 5, in operation S242, the device 100 may analyze whether the masking in operation S220 was performed in view of replacement patterns. For example, the device 100 may analyze whether the replacement pattern flag stored in the memory 130 is set, and determine that the masking was performed in view of the replacement patterns when the replacement pattern flag is set.

In operation S244, upon determining that the masking has been performed in view of replacement patterns, the device 100 may determine whether the downstream environment that is to receive the released data is secured. For example, the device 100 may request information from the downstream environment related to network security and determine whether the downstream environment meets the security requirements of the organization. For example, device 100 may check whether the downstream environment exists in the same subnet as the device 100, check an allowed range or specific network addresses, validate a trusted certificate of the downstream environment, validate an attached device (such as a removable storage device) is properly encrypted, or similar functions to ensure compliance of the downstream environment.

In operation S246, the device 100 may release a replacement value map to the downstream environment, where the replacement value map indicates the correspondence between the replacement values (e.g., "A1" and a corresponding data type (e.g., "first name") of the denied tokens.

Thereafter, in operation S248, whether or not the device 100 utilized replacement patterns, the device 100 may deliver the data to stakeholders, ensuring all internal sharing requirements are satisfied. This may mean providing access to the masked data through assigning access credentials to the corpus of masked data elements that allow the stakeholder to access only the data necessary and approved for their use case. Any other co-located data may be walled off by alternate credential requirements. Alternatively, the device 100 may copy the masked data over to a new environment where the correct personnel can access the masked data.

While FIG. 5 illustrates that the release of the replacement map value and the release of the data are two separate operations, upon determining that the downstream environment is secure, the device may perform operations S246 and S248 simultaneously.

Further, in some example embodiments, the device 100 may not consider replacement patterns, and may instead simply release the data in operation S248 without performing operations S242, S244 and S246.

FIG. 6 illustrates examples of obfuscated data according to example embodiments.

Referring to FIG. 6, the original free text data 610 may include a string reciting "We will have dinner and the first meeting Friday, Jun. 7, 2022 at 6:30 p.m. at The Houstonian Hotel. The Houstonian is at 111 N. Post Oak Lane, 77024, which is too far away."

As shown in FIG. 6, a traditional method of obfuscating data, such as deny list masking, may be programmed to deny, for example, numbers "0" through "9," and designations of streets such as the word "lane." By applying such a traditional obfuscating method, the original free text data may be transformed to output a string 620 including "We will have dinner and the first meeting Friday June #, # at # p.m. at The Houstonian Hotel. The Houstonian is at # N. Post Oak #, #, which is too far away."

While deny list masking may obfuscate the original free text data, such a traditional approach may not sufficiently mask confidential data, such as part of the address, which if passed along to downstream data recipients, could be problematic from a data security perspective.

In contrast, as discussed in more detail below, by utilizing the Token Adjustable Data Allowlist Algorithm (TADDA) according to example embodiments, may better ensure that confidential information is obscured from the original free text data. Moreover, enough tokens are still unmasked so that the general topic of the free text data element (sentence) can be gleaned. This data may still be useful to a wide variety of use cases but does not incur nearly the same level of risk to the organization sharing it.

An example of performing TADDA on the original free text data 610 will be discussed below with reference to FIGS. 1-6.

In operation S200, the device 100 may create an allow list, based loosely on a stock allow list which contains tokens that are known to be non-sensitive. This stock allow list may include words excluding those words that may be sensitive, as well as common names and all numbers. Thereafter, the device 100 may cross-reference the remaining words with the company's external blog posts. The device 100 may remove words that do not occur in one or more of the company's blog posts. Then, the device 100 may score the remaining words with a machine learning model to determine their likelihood of being sensitive. Features considered in this modeling effort may include a frequency of the token within company blog posts, a number of results retrieved when that token is searched for into a search engine, a length of the word itself, a part of speech, the word's origin, an average position of the word within sample sentence (for example, does the word typically occur towards the front or end of sentences in the company's blog posts?), complexity of dictionary definition, etc. With all of these factors under consideration, the model outputs, for each of the remaining token, a score indicating the likelihood that the token is sensitive. Initially, only tokens that are <=10% likely to be sensitive make it onto the allow list. Optionally, some subject-specific terms such as "event", "venue", "learn", "train", "buy", "membership", and "complain" can also be added to the list as terms determined to be relevant to the topic being studied.

In operation S210, the device 100 may convert the characters of allow list elements to lower case and remove any punctuation so that all words are represented in a standardized manner. For example the token, "As-is:", becomes "as-is". Alternatively, the device 100 may perform operation S210 concurrently with operation S200 such that words are added to the allow list only after they have been cleaned.

In operation S220, the free text is masked according to the following operations.

In operation S300, the device 100 reads each suggestion provided by clients. For example, the device 100 may read these suggestions into a Pandas Data Frame within Python, or intermediary SQL table.

In operation S310, the device 100 may standardize the client suggestions by, for example, removing punctuation and converting all characters to lower case. In the example above, the original client suggestion would then be converted into "we will have dinner and the first meeting friday Jun. 7, 2022 at 630 pm at the houstonian hotel the houstonian is at 111 n post oak lane 77024 which is too far away."

In operation S320, the device 100 may match each token within the standardized copy to its original token. In the listed example, mappings are ("we" to "We"), ("will" to "will"), ("have" to "have") . . . ("houstonian" to "Houstonian"), etc.

In operation S330, the device 100 may designate a storage location that string data can be appended in the following operations. For example, the device 100 may create a new string within Python.

In operation S340, the device 100 checks each standardized token from the mapping in S320 against the standardized allow list.

In operation S350, if the token is present in the allow list, the device appends the unstandardized mapped value to the string created in S330.

In operation S360, if the token is not present in the allow list, the device 100 may mask the data according to the process in FIG. 4.

If the device 100 is configured not to utilize replacement patterns (No in operation S362), in operation S366, the device 100 may each token to the replacement pattern tokens of "#". By applying the Token Adjustable Data Allowlist Algorithm (TADDA) method, the original free text data 610 may be transformed to output a string 630 including "We # have # and the first meeting #, # #, # at # p.m. at The #Hotel. The # is at # # Post # #, #, which is too far away." Thereafter, in operation S370, after analyzing every token in a client's suggestion, the device 100 may add the full string representing the client's masked suggestion to a corpus of .txt files to be shared with the downstream recipients, or appended to a database table of masked suggestions with access controlled by the test data management team or data security personnel.

String 630 may be more desirable than String 620 because String 630 may better ensure that the retained tokens taken individually are non-sensitive since such tokens correspond to tokens listed on the allow list and verified as non-sensitive. In contrast, String 620, may not provide this certainty since, by the use of a deny list rather than an allow list, every token that ends up retained does not correspond to tokens on a pre-vetted allow list, and, thus, it is possible that some of those tokens should have been filtered. In FIG. 6, as an example, the word "Houstonian" may be sensitive, such token is not masked in String 620 because it was not reviewed and put on the deny list. In String 630, even if it was not reviewed, since the string is not on the allow list, "Houstonian" is masked.

In contrast, if the device 100 is configured to utilize replacement patterns (YES in operation S362), rather than always replacing tokens with the default mapped character, the device 100 may instead replace the tokens with replacement patterns as discussed below.

For example, in operation S364, the device 100 may check whether the current token matches a replacement pattern. In the example above, the replacement patterns include [numbers], [day of week], [month], [year], etc. Alternatively, as discussed above with regards to FIG. 4, the replacement patterns may include nondescript phrases such as "A1," "A2," etc. so that the replacement pattern itself may not provide an individual outside of the organization with any information based on the replacement pattern alone.

For tokens that do not match a particular replacement pattern, such as "will" and "dinner," the device 100 may proceed to operation S366 and map these tokens to the replacement pattern tokens of, for example, "[unclassified]."

In contrast, for tokens that do match a particular replacement pattern, in operation S368, the device 100 maps tokens in the example above that match a particular replacement pattern, such as "Friday" and "630" to the replacement pattern tokens [day of week] and [number], respectively. Thereafter, in operation S369, the device 100 adds the replacement pattern token to the string/place set aside for data storage described in S330.

By applying the Token Adjustable Data Allowlist Algorithm (TADDA) method with replacement patterns, the original free text data 610 may be transformed to output a string 630-1 including "We [unclassified] have [unclassified] and the first meeting [day of week], [month] [number], [year] at [number] p.m. at The [unclassified] Hotel. The [unclassified] is at [number] [unclassified] Post [unclassified] [unclassified], [zip code], which is too far away."

In operation S370, after analyzing every token in a client's suggestion, the device 100 may add the full string representing the client's masked suggestion to a corpus of .txt files to be shared with the downstream recipients, or appended to a database table of masked suggestions with access controlled by the test data management team or data security personnel.

Referring back to FIG. 2, after masking the data in operation S220, in operation S230, the device 100 may determine if the data meets the coverage and utility requirements.

For example, the device 100 may analyze the output string 640 as compared to the original free text data 610 and determine that 70% of tokens are unmasked according to the methodology above. If the certainty threshold is set at least 60%, then the device 100 may determine that the 70% coverage meets the criteria. However, if the certainty threshold was not met, the device 100 may return to operation S200 while lowering the certainty threshold incrementally. The device 100 may be set to not allow the certainty threshold to be set below the coverage threshold such that sensitive data cannot be released if it does not meet a minimum obfuscating requirement based on organizational requirements.

In operation S240, if the device 100 determines that the data has sufficient coverage and utility in S230, the device 100 may release the data according to the process in FIG. 5.

Referring to FIG. 5, in operation S242, the device 100 may determine whether a flag is set in the memory that replacement values should be used. If the flag is not set, the device 100 may release the data without additional steps in operation S248.

If the flag is set, in operation S244, the device 100 may determine whether the downstream environment, in this case, a file system, meets the security requirements.

If the downstream environment is secure, in operations S246 and S248, the device 100 may release, in addition to the masked string 630-1, the map/tuple of what was replaced <[day of week], Friday, Monday>, <[month], June, May>, and < [zip code], 77024, 78758>. If the downstream environment is not secure, in operation S248, the device 100 may only release the masked artifact.

Thereafter, downstream recipients may access and analyze the masked data and may optionally use the replacement value maps to better understand the masked data while ensuring security requirements are met. For example, the downstream recipients may utilize the masked string 630-1 and the transmitted replacement patterns to create the string 630-2 "We # have # and the first meeting Monday, May 100, 1961 at 99 p.m. at The # Hotel. The # is at 20 # Post # #, 78758, which is too far away." The string 630-2 provides more context to the downstream recipients as compared to the string 630-1 without sacrificing the integrity of the data.

This written description uses examples of the subject matter disclosed to enable any person skilled in the art to practice the same, including making and using any devices, systems, and/or non-transitory computer readable media, and/or performing any incorporated methods. The patentable scope of the subject matter is defined by the claims, and may include other examples that occur to those skilled in the art. Such other examples are intended to be within the scope of the claims.

What is claimed is:

1. A device configured to obfuscate text data, the device comprising:
   a memory configured to store computer readable instructions; and
   processing circuitry configured to execute the computer readable instructions to cause the device to,
   electronically determine whether a version of incoming tokens within the text data corresponds to one of allowed tokens within an allow list,
   in response to determining that the version of the incoming tokens within the text data does not correspond to any of the allowed tokens, selectively mask the incoming tokens to obtain masked tokens by either:
      i) appending the masked tokens in place of the incoming tokens within the text data to generate a string, and adding a delineator to the string thereafter, or
      ii) determining whether a plurality of replacement patterns each corresponding to a category of regularly occurring denied tokens stored in the memory includes a corresponding replacement pattern that corresponds to the incoming tokens, and appending the corresponding replacement pattern in place of the incoming tokens within the text data to generate the string and adding the delineator to the string thereafter, in response to determining that the plurality of replacement patterns includes the corresponding replacement pattern,
   add the string to a corpus of masked data elements, in response to reaching an end of the text data, and
   electronically release, the corpus of the masked data elements with the string added, to an electronic device downstream, when it is determined that coverage threshold of the corpus of the masked data elements is satisfied.

2. The device of claim 1, wherein the device is further configured to create the allow list.

3. The device of claim 2, wherein the device is further configured to standardize the allowed tokens within the allow list.

4. The device of claim 1, wherein the device is configured to selectively mask elements by standardizing the incoming tokens within the text data based on a standardization employed within the allow list.

5. The device of claim 4, wherein the device is configured to selectively mask the incoming tokens by mapping the incoming tokens within the text data to a standardized version thereof.

6. The device of claim 5, wherein the device is configured to selectively mask the incoming tokens by evaluating whether the standardized version of the incoming tokens corresponds to one of the allowed tokens within the allow list.

7. The device of claim 6, wherein the appending the masked tokens appends the masked tokens in place of the standardized version of the incoming tokens.

8. The device of claim 7, wherein the device is configured to determine a coverage of the corpus of the masked data elements based on a ratio of the corpus that contains unmasked tokens.

9. The device of claim 6, wherein the appending the corresponding replacement pattern to the string appends the corresponding replacement pattern in place of the standardized version of the incoming tokens.

10. The device of claim 9, the device is configured to, release the corpus of the masked data elements to a downstream environment along with a replacement values map, if the device determines that the downstream environment meets set security requirements, the replacement values map containing information that allows the downstream environment to replace the corresponding replacement pattern with data that provides an indication of the category of regularly occurring denied tokens that is associated with the standardized version of the incoming tokens.

11. The device of claim 1, wherein the device is configured to select the allow list from among a library of allow lists or utilize an allow list that has been custom-made for the text data.

12. A method of obfuscating text data, the method comprising:

electronically determining by a computing device, whether a version of incoming tokens within the text data corresponds to one of allowed tokens within an allow list;

selectively masking by a computing device, the incoming tokens to obtain masked tokens, in response to determining that the version of the incoming tokens within the text data does not correspond to any of the allowed tokens, the selectively masking including either:

i) appending the masked tokens in place of the incoming tokens within the text data to generate a string, and adding a delineator to the string thereafter, or ii) determining whether a plurality of replacement patterns each corresponding to a category of regularly occurring denied tokens stored in a memory includes a corresponding replacement pattern that corresponds to the incoming tokens, and appending the corresponding replacement pattern in place of the incoming tokens within the text data to generate the string and adding the delineator to the string thereafter, in response to determining that the plurality of replacement patterns includes the corresponding replacement pattern;

adding by a computing device, the string to a corpus of masked data elements, in response to reaching an end of the text data; and electronically releasing by a computing device, the corpus of the masked data elements with the string added, to an electronic device downstream, when it is determined that coverage threshold of the corpus of the masked data elements is satisfied.

13. The method of claim 12, further comprising:

creating by a computing device, the allow list.

14. The method of claim 13, further comprising:

standardizing by a computing device, the allowed tokens within the allow list.

15. The method of claim 12, wherein the selectively masking comprises:

standardizing by a computing device, the incoming tokens within the text data based on a standardization employed within the allow list.

16. The method of claim 15, wherein the selectively masking comprises:

mapping by a computing device, the incoming tokens within the text data to a standardized version thereof.

17. The method of claim 16, wherein the selectively masking comprises:

evaluating by a computing device, whether the standardized version of the incoming tokens corresponds to one of the allowed tokens within the allow list.

18. The method of claim 17, wherein the appending the masked tokens appends the masked tokens in place of the standardized version of the incoming tokens.

19. The method of claim 18, further comprising:

determining by a computing device, a coverage of the corpus of the masked data elements based on a ratio of the corpus that contains unmasked tokens.

20. The method of claim 17, wherein the appending the corresponding replacement pattern to the string appends the corresponding replacement pattern in place of the standardized version of the incoming tokens.

21. The method of claim 20, further comprising:

releasing the corpus of the masked data elements to a downstream environment along with a replacement values map, if the downstream environment meets set security requirements, the replacement values map containing information that allows the downstream environment to replace the corresponding replacement pattern with data that provides an indication of the category of regularly occurring denied tokens that is associated with the standardized version of the incoming tokens.

22. The method of claim 12, wherein the electronically releasing comprises:

electronically evaluating an effectiveness of masking in the generated string based on one or more criteria, releasing the corpus of the masked data elements with the string added to the downstream electronic device, in response to the effectiveness of the masking satisfying the one or more criteria, and refining the allow list and electronically re-masking the incoming tokens, in response to the effectiveness of the masking not satisfying the one or more criteria.

23. The method of claim 22, wherein the selectively electronically releasing the generated string further comprises:

electronically evaluating whether the downstream electronic device satisfies set security requirements, and releasing the corpus of the masked data elements with the string added to the downstream electronic device, in response to the downstream electronic device satisfying the set security requirements, wherein the downstream electronic device is configured to electronically access and analyze the masked tokens within the generated string released thereto.

24. A non-transitory computer readable medium storing computer readable instructions that, when executed by processing circuitry of a device, configures the device to:

electronically determine whether a version of incoming tokens within text data corresponds to one of allowed tokens within an allow list;

in response to determining that the version of the incoming tokens within the text data does not correspond to any of the allowed tokens, selectively mask the incoming tokens to obtain masked tokens by either:

i) appending the masked tokens in place of the incoming tokens within the text data to generate a string, and adding a delineator to the string thereafter, or ii) determining whether a plurality of replacement patterns each corresponding to a category of regularly occurring denied tokens stored in a memory includes a corresponding replacement pattern that corresponds to the incoming tokens, and appending the corresponding replacement pattern in place of the incoming tokens within the text data to generate the string and adding the delineator to the string thereafter, in response to determining that the plurality of replacement patterns includes the corresponding replacement pattern;

add the string to a corpus of masked data elements, in response to reaching an end of the text data; and electronically release, the corpus of the masked data elements with the string added, to an electronic device downstream, when it is determined that coverage threshold of the corpus of the masked data elements is satisfied.

25. The device of claim 1, wherein the device is configured to selectively electronically release the generated string by, electronically evaluating an effectiveness of masking in the generated string based on one or more criteria, releasing the generated string to the downstream electronic device, in response to the effectiveness of the masking satisfying the one or more criteria, and refining the allow list and electronically re-masking the incoming tokens, in response to the effectiveness of the masking not satisfying the one or more criteria.

26. The device of claim 25, wherein the device is configured to electronically release the corpus of the masked data elements with the string added by, electronically evaluating whether the downstream electronic device satisfies set security requirements, and releasing the corpus of the masked data elements with the string added to the downstream electronic device, in response to the downstream electronic device satisfying the set security requirements, wherein the downstream electronic device is configured to electronically access and analyze the masked tokens within the generated string released thereto.

* * * * *